United States Patent [19]

Aoki et al.

[11] Patent Number: 5,190,988

[45] Date of Patent: Mar. 2, 1993

[54] ULTRAVIOLET-CURABLE ORGANOPOLYSILOXANE COMPOSITION CONTAINING A BENZOINSULPHONATE INITIATOR AND METAL CATALYST

[75] Inventors: Shunji Aoki; Toshio Ohba; Yasuaki Hara, all of Gunma, Japan

[73] Assignee: Shin-Etsu Chemical Company, Limited, Tokyo, Japan

[21] Appl. No.: 706,706

[22] Filed: May 29, 1991

[30] Foreign Application Priority Data

May 30, 1990 [JP] Japan ................... 2-138608

[51] Int. Cl.$^5$ ................. C08F 2/50; C08F 4/08; C08G 77/06; C08G 77/04

[52] U.S. Cl. ................... 522/18; 522/42; 522/44; 522/59; 522/99; 522/170; 528/13; 528/14; 528/19; 528/23; 528/25

[58] Field of Search ............ 522/17, 18, 42, 44, 522/99, 170; 528/13, 14, 19, 23, 25

[56] References Cited

U.S. PATENT DOCUMENTS

| | | | |
|---|---|---|---|
| 3,732,273 | 5/1973 | Heine et al. | 522/42 |
| 4,450,360 | 5/1984 | Crivello et al. | 522/170 |
| 4,504,372 | 3/1985 | Kirchmayr et al. | 522/42 |
| 4,576,999 | 3/1986 | Eckberg | 522/170 |

OTHER PUBLICATIONS

Hageman, "Photoinitiators and Photoinitiation, 2a): C-versus O-Alkylation in the Hydroxymethylation of Benzoin", Makromol. Chem., Rapid Commun. 2, 517-521 (1981).

Gauer et al., "Photoinitiators and Photoinitiation, 5a): Photodecomposition of Some α-Hydroxymethylbenzoin Derivatives: Sulfonic Esters", Makromol. Chem. 185, 1795-1808 (1984).

Primary Examiner—Marion E. McCamish
Assistant Examiner—Susan Berman
Attorney, Agent, or Firm—Millen, White, Zelano and Branigan

[57] ABSTRACT

The invention provides a high-sensitivity ultraviolet-curable organopolysiloxane composition suitable for use as a surface-release treatment of various substrate such as release-paper sheets and the like. The composition comprises, as the essential ingredients, (a) an organopolysiloxane having a viscosity in the range from 50 to 3000 centipoise at 25° C. and containing, in a molecule, at least one (meth)acryloxy-substituted monovalent hydrocarbon group or at least one epoxy- or glycidyloxy-substituted monovalent hydrocarbon group, and (b) a sulfonate compound such as 2-hydroxy-3-oxy-2,3-diphenylpropyl methanesulfonate as the photopolymerization initiator. The sensitivity of the composition to photopolymerization can be further increased by the addition of a specific salt such as sodium hexafluoroantimonate and sodium hexafluorophosphate.

11 Claims, No Drawings

ULTRAVIOLET-CURABLE ORGANOPOLYSILOXANE COMPOSITION CONTAINING A BENZOINSULPHONATE INITIATOR AND METAL CATALYST

BACKGROUND OF THE INVENTION

The present invention relates to an ultraviolet-curable organopolysiloxane composition or, more particularly, to an ultraviolet-curable organopolysiloxane composition which is cured with a relatively small dose of ultraviolet irradiation at room temperature and is useful as a coating agent of release paper.

It is a well established technology that an ultraviolet-curable organopolysiloxane composition is applied to the surface of a substrate material and irradiated with ultraviolet light so that the coating film is cured to give a thin surface film of the cured organopolysiloxane composition having surface releasability. Several different types of ultraviolet-curable organopolysiloxane compositions suitable for such an application are known in the prior art including a composition comprising an organopolysiloxane having epoxy-functional groups and an onium salt-based compound as a photopolymerization initiator disclosed in Japanease Patent Kokai 56-38350 and a composition comprising an organopolysiloxane having acryloxy-functional groups and a free-radical photopolymerization initiator disclosed in Japanease Patent Publication 53-36515.

The cured surface film of each of these known compositions, however, has a surface property inherent in the epoxy-functional groups or acryloxy-functional groups and it is a difficult matter to obtain a cured surface film having the advantageous intermediate properties originating in both types. In this regard, an improved ultraviolet-curable organopolysiloxane composition is proposed in Japanese Patent Kokai 58-213024 according to which an organopolysiloxane having epoxy-functional and/or acryloxy-functional groups is admixed with a cationic onium salt-based photopolymerization initiator and a free-radical photopolymerization initiator in combination. This composition, however, is defective because full curing of the composition can be achieved so as to prevent migration of the silicone constituent from the surface after curing only by the combined use of two different types of photopolymerization initiators.

SUMMARY OF THE INVENTION

The present invention accordingly has an object to provide a novel ultraviolet-curable organopolysiloxane composition which is curable even by the irradiation with a relatively small dose of ultraviolet light to be free from the above described problems and disadvantages in the prior art compositions.

Thus, the ultraviolet-curable organopolysiloxane composition of the present invention comprises, as a mixture: (a) 100 parts by weight of an organopolysiloxane having a viscosity in the range from 50 to 3000 centipoise at 25° C. and containing, in a molecule, at least one (meth)acryloxy-substituted or epoxy- or glycidyloxy-substituted monovalent hydrocarbon group; and (b) from 0.1 to 20 parts by weight of a sulfonate compound represented by the general formula $$R^1-CO-CR^2(OR^3)-CR^4{}_2-O-SO_2-R^5, \quad (I)$$

in which $R^1$ and $R^2$ are each an unsubstituted or substituted aryl group having 6 to 30 carbon atoms, $R^3$ is a hydrogen atom or a monovalent hydrocarbon group having 1 to 7 carbon atoms, $R^4$ is a hydrogen atom or a monovalent hydrocarbon group having 1 to 5 carbon atoms and $R^5$ is an unsubstituted or substituted monovalent hydrocarbon group having 1 to 20 carbon atoms.

The component (a) can be an organopolysiloxane having both of the (meth)acryloxy-substituted and epoxy- or glycidyloxy-substituted monovalent hydrocarbon groups in a molecule or a combination of a first organopolysiloxane having at least one (meth)acryloxy-substituted monovalent hydrocarbon group in a molecule and a second organopolysiloxane having at least one epoxy- or glycidyloxy-substituted monovalent hydrocarbon group in a molecule.

Further, the above defined organopolysiloxane composition consisting of the components (a) and (b) is admixed with (c) 0.1 to 20 parts by weight of a salt represented by the general formula $$MA_q, \quad (II)$$

in which M is a cation of an alkali metal or alkaline earth metal element, A is a non-nucleophilic and non-basic anion selected from the group consisting of $SbF_6{}^-$, $SbCl_6{}^-$, $AsF_6{}^-$, $PF_6{}^-$, $BF_4{}^-$, $HSO_4{}^-$ and $ClO_4{}^-$ and the subscript q is 1 or 2.

DETAILED DESCRIPTION OF THE PREFERRED EMBODIMENTS

As is described above, the ultraviolet-curable organopolysiloxane composition of the invention comprises, as the essential ingredients, the organopolysiloxane as the component (a), which is the base ingredient of the composition, and the sulfonate compound as the component (b), which is the photopolymerization initiator for the component (a), with optional admixture of the alkali or alkaline earth metal salt of a non-nucleophilic and non-basic anion as the component (c), which serves as a curing aid.

The base ingredient as the component (a) in the inventive composition is an organopolysiloxane having a viscosity of 50 to 3000 centipoise at 25° C. and containing, in a molecule, at least one (meth)acryloxy-substituted monovalent hydrocarbon group and/or at least one epoxy- or glycidyloxy-substituted monovalent hydrocarbon group. This organopolysiloxane should preferably have a straightly linear molecular structure represented by the general formula $$X_aY_bR_{3-a-b}Si-O+SiR_2-O)_r+SiRX-O)_s+SiRY-O)_tR_{3-a-b}X_aY_b, \quad (III)$$

in which R is an unsubstituted or substituted monovalent hydrocarbon group exemplified by alkyl groups such as methyl, ethyl, propyl, butyl and octyl groups, cycloalkyl groups such as cyclohexyl group, alkenyl groups such as vinyl and allyl groups and aryl groups such as phenyl and tolyl groups as well as those substituted hydrocarbon groups obtained by replacing a part or all of the hydrogen atoms in the above named hydrocarbon groups with halogen atoms, cyano groups, hydroxy groups, alkoxy groups and the like such as chloromethyl, 3,3,3-trifluoropropyl, 2-cyanoethyl, 2-hydroxyethyl and 2-methoxyethyl groups, X is a monovalent hydrocarbon group substituted by a (meth)acryloxy group, Y is a monovalent hydrocarbon group substituted by an epoxy or glycidyloxy group, the subscripts a and b are each 0, 1, 2 or 3 with the proviso that a+b is 0, 1, 2 or 3 and the subscripts r, s and t are each a positive integer but can be zero when a or b is not zero.

The (meth)acryloxy-substituted monovalent hydrocarbon group denoted by X is represented by the general formula

$$-R^6-O-CO-CR^7=CH_2, \qquad (IV)$$

in which $R^6$ is an alkylene or alkenylene group having a linear or branched structure and $R^7$ is a hydrogen atom or a methyl group, and is exemplified by 3-acryloxypropyl group in which $R^6$ is a propylene group and $R^7$ is a hydrogen atom.

The epoxy- or glycidyloxy-substituted monovalent hydrocarbon group denoted by Y is exemplified by 3-(glycidyloxy)propyl, 2-(glycidyloxycarbonyl)propyl, 2-(3,4-epoxycyclohexyl)ethyl and 2-(4-methyl-3,4-epoxycyclohexyl)propyl groups.

The organopolysiloxane as the component (a) can contain, simultaneously in a molecule, at least one (meth)acryloxy-substituted monovalent hydrocarbon group and at least one epoxy- or glycidyloxy-substituted monovalent hydrocarbon group. It is of course optional that the organopolysiloxane as the component (a) is a combination of a first organopolysiloxane containing at least one (meth)acryloxy-substituted monovalent hydrocarbon group in a molecule and a second organopolysiloxane containing at least one epoxy- or glycidyloxy-substituted monovalent hydrocarbon group in a molecule in any desired weight proportion between, for example, from 1:99 to 99:1. When it is desired to have the unique characteristics inherent in both of these two types of organopolysiloxanes exhibited in combination, however, the mixing ratio of the two types of the organopolysiloxanes should preferably be in the range from 90:10 to 10:90 by weight.

The organopolysiloxane containing, in a molecule, both of the (meth)acryloxy-substituted monovalent hydrocarbon groups and epoxy- or glycidyloxy-substituted monovalent hydrocarbon groups can be prepared according to the procedure disclosed in Japanease Patent Kokai 58-213024. Namely, an organohydrogenpolysiloxane having hydrogen atoms directly bonded to the silicon atoms is subjected to the hydrosilation reaction partially with an epoxy group-or glycidyloxy group-containing alkenyl compound and then subjected to the second hydrosilation reaction with a halogen-substituted α-olefin compound followed by the substitution for the halogen atoms by (meth)acryloxy groups in the presence of a basic compound as a hydrogen halide acceptor.

In the above given general formula (III) for the organopolysiloxane as the component (a), the sum of the subscripts a and b is preferably 0 to 1 because an organopolysiloxane of the formula in which a+b is 2 or 3 can be prepared only with some difficulties. The degree of polymerization or the viscosity of the organopolysiloxane is determined by the sum of the subscripts r, s and t, i.e. r+s+t. Namely, r+s+t should have a value sufficiently large to impart the organopolysiloxane with a viscosity in the range from 50 to 3000 centipoise at 25° C. When the viscosity of the organopolysiloxane is outside of this range, the organopolysiloxane composition has poor workability in coating of the substrate surface. The value of (s+t)/(r+s+t), which is determinant of the relative content of the functional groups X and/or Y in the organopolysiloxane, is not particularly limitative but it is preferably in the range from 0.01 to 0.20 in order to ensure good balance between the curability of the inventive composition and the surface-releasability of the cured coating layer of the composition.

The component (b) in the inventive composition, which is a photopolymerization initiator for the organopolysiloxane as the component (a), is a sulfonate compound represented by the above given general formula (I), in which $R^1$ and $R^2$ are each an aryl group such as phenyl, tolyl, xylyl, biphenyl, naphthyl, anthranyl and phenanthryl groups which may be substituted with a hydrocarbon group including alkyl, alkenyl and aryl groups or a substituted hydrocarbon group obtained by replacing a part or all of the hydrogen atoms in the above named hydrocarbon groups with halogen atoms, cyano groups, hydroxy groups or alkoxy groups, or a substituted aryl group obtained by replacing a part or all of the hydrogen atoms therein with halogen atoms, hydroxy groups or alkoxy groups. The group denoted by $R^2$ can also be a heterocyclic aromatic group such as furyl, thienyl, pyrrolyl and pyridyl groups. $R^3$ in the formula is a hydrogen atom or a monovalent hydrocarbon group having 1 to 7 carbon atoms such as alkyl, alkenyl and aryl groups, $R^4$ is a hydrogen atom, a monovalent hydrocarbon group such as alkyl and alkenyl groups having 1 to 5 carbon atoms, or an alkoxy group and $R^5$ is a monovalent hydrocarbon group such as alkyl, alkenyl and aryl groups having 1 to 20 carbon atoms or a substituted hydrocarbon group obtained by replacing a part or all of the hydrogen atoms in the above named hydrocarbon groups with halogen atoms, cyano groups, hydroxy groups, alkoxy groups, nitro groups and the like.

Examples of the sulfonate compound suitable as the component (b) include: 2-hydroxy-3-oxy-2,3-diphenylpropyl methanesulfonate; 2-hydroxy-3-oxy-2,3-diphenylpropyl octanesulfonate; 2hydroxy-3-oxy-2,3-diphenylpropyl trifluoromethanesulfonate; 2-methoxy-3-oxy-2,3-diphenylpropyl methanesulfonate; 2-hydroxy-3-oxy-2-(4-methylphenyl)-3-phenylpropylmethanesulfonate; 2-hydroxy-3-oxy-2-(4-hydroxyphenyl)-3-phenyl methanesulfonate and the like.

The amount of the component (b) in the inventive organopolysiloxane composition is in the range from 0.5 to 20 parts by weight or, preferably, from 1 to 10 parts by weight per 100 parts by weight of the organopolysiloxane as the component (a). When the amount of the sulfonate compound is too small, the composition would have poor curability by the ultraviolet irradiation as a matter of course. When the amount thereof is too large, on the other hand, the surface properties, such as releasability, of the cured coating layer of the composition would be adversely influenced though with high curability by the ultraviolet irradiation.

The component (c) optionally admixed with the inventive organopolysiloxane composition, which serves as a curing aid, is a salt of an alkali metal or alkaline earth metal cation with a specific non-nucleophilic and non-basic anion as represented by the general formula $$MA_q, \quad (II)$$

in which M is a cation of an alkali metal or alkaline earth metal element exemplified by $Na^+$, $K^+$, $Mg^{2+}$ and $Ca^{2+}$ and the like, A is a non-nucleophilic and non-basic anion selected from the group consisting of $BF_4^-$, $PF_6^-$, $AsF_6^-$, $SbF_6^-$, $SbCl_4^-$, $ClO_4^-$, $HSO_4^-$ and the like and the subscript q is 1, when M is an alkali metal cation, or 2, when M is an alkaline earth metal cation. Particularly preferable as the component (c) are sodium hexafluorantiomonate $NaSbF_6$ and sodium hexafluorophosphate $NaPF_6$ in view of their high activity as a curing aid and good availability as a commercial product.

The amount of the component (c), when added, in the inventive organopolysiloxane composition should be in the range from 0.1 to 20 parts by weight per 100 parts by weight of the organopolysiloxane as the component (a). When the amount thereof is too small, no advantageous effect can be obtained in the promotion of curing of the composition while, when the amount is too large, adverse influences are caused on the surface properties of the cured coating layer of the composition.

The ultraviolet-curable organopolysiloxane composition of the present invention can be prepared by uniformly blending the above described components (a), (b) and, optionally, (c) each in a specified amount. It is of course optional according to need that the inventive composition is further admixed with various kinds of additives including, for example, reactive diluents such as (meth)acrylic or epoxy-functional monomers, adhesion improvers, levelling agents, antistatic agents, defoaming agents, pigments and the like. The composition can be diluted by the addition of an organic solvent with an object to improve the workability in coating.

The ultraviolet-curable organopolysiloxane composition of the present invention prepared in the above described manner can be easily cured by the irradiation with a relatively small dose of ultraviolet light to exhibit excellent surface releasability so that the composition can be used as a back-surface coating agent for pressure-sensitive adhesive tapes, protective coating material on plastic articles, vehicle of coating compositions and the like. When it is used as a surface-releasing agent on various kinds of substrates such as paper, plastic films, foils of metal, e.g., aluminum, the substrate surface is coated with the inventive composition in a coating thickness of 0.1 to 100 μm by using a suitable coating machine such as bar coaters, gravure coaters, reverse coaters, spray coaters and the like followed by the irradiation of the coating layer with ultraviolet light so that the coating layer is rapidly cured to give a surface-releasing cured coating layer on the substrate surface. Suitable ultraviolet light sources for the purpose include medium- or high-pressure mercury lamps, metal halide lamps and the like. The irradiation time for complete curing of the composition naturally depends on the intensity of the ultraviolet light but, as a rough measure, an irradiation time of 0.1 to 10 seconds is usually sufficient therefor when the lamp is a high-pressure mercury lamp of 80 watts/cm output at a distance of 8 cm from the coating layer under irradiation.

In the following, the ultraviolet-curable organopolysiloxane composition of the invention is illustrated in more detail by way of examples as preceded by the description of the synthetic procedure of the sulfonate compound used as the component (b) in the inventive composition, which was conducted generally in accordance with the teaching in Makromol. Chem., Rapid Commun., volume 2, page 517 (1981) give by H.J. Hageman. In the following description, the term of "parts" always refers to "parts by weight" and the values of viscosity are all those obtained by the measurement at 25° C. The ultraviolet-curable organopolysiloxane compositions prepared in the examples were evaluated by the determination of the peeling resistance and adhesiveness retention by using an adhesive or a pressure-sensitive adhesive tape on the surface of the cured coating layer of the composition according to the following procedures.

Test of Peeling Resistance

A film or sheet as the substrate was coated with the composition in a specified coating amount which was irradiated with ultraviolet light in a specified dose to be converted into a cured surface film having surface releasability. Thereafter, the thus coated surface of the substrate was coated with a solution-type acrylic pressure-sensitive adhesive (Oribine BPS-8170, a product by Toyo Ink Manufacturing Co.) or an emulsion-type acrylic pressure-sensitive adhesive (Oribine BPW-3110H, a product of the same company, supra) followed by a heat treatment at 100° C. for 3 minutes.

A sheet of wood-free paper having a basis weight of 64 g/m² was applied to the thus adhesive-coated surface and subjected to aging for 20 hours at 25° C. under a load of 20 g/cm² to give a laminated test sample. The laminated test sample was cut into strips of 5 cm width and the covering paper sheet was peeled off from the substrate by pulling in a 180° direction using an automatic tensile tester at a pulling velocity of 30 cm/minute to record the peeling resistance in g/5 cm width.

Test of Adhesiveness Retention

A polyester film-based pressure-sensitive adhesive tape (Lu-mirror 31B Tape, a product by Nitto Denko Co.) was applied and bonded to the surface of the surface-releasing coating layer of the cured organopolysiloxane composition on a substrate formed in the same manner as in the test of the peeling resistance followed by aging for 20 hours at 70° C. under a load of 20 g/cm² and then the adhesive tape was taken off by peeling from the substrate surface. The thus taken adhesive tape was again applied and bonded to a plate of Teflon. The adhesive tape was then peeled off from the Teflon plate by pulling in a 180° direction using an automatic tensile tester at a pulling velocity of 30 cm/minute to record the first peeling resistance in g.

Separately, the same bonding and peeling test of the pressure-sensitive adhesive tape as above was conducted except that the substrate provided with the surface-release coating layer as replaced with a clean Teflon plate to record the second peeling resistance in g.

The adhesiveness retention was given by the ratio of the above mentioned first peeling resistance to the second peeling resistance in %. A larger value of this adhesiveness retention indicates that the decrease in the adhesiveness of the adhesive tape due to migration of the silicone from the cured surface-release coating layer is smaller as a result of the more complete curing of the organopolysiloxane composition in the coating layer.

Synthetic Preparation

A solution of 100 parts of benzoin in 240 parts of dimethyl sulfoxide was added dropwise over 10 minutes to a dispersion of 17 parts of paraformaldehyde having a purity of 75% and 2.6 parts of potassium hydroxide in 580 parts of dimethyl sulfoxide and the mixture was agitated for further 15 minutes to effect the reaction which was terminated with addition of diluted hydrochloric acid followed by the admixture of the reaction mixture with 900 parts of water. The thus obtained aqueous solution was extracted with ethyl acetate and the ethyl acetate extract was washed with a saturated aqueous solution of sodium chloride and concentrated by evaporating the solvent under reduced pressure to give 113 parts of α-hydroxymethyl benzoin. The yield was more than 99% of the theoretical value.

In the next place, a solution was prepared by dissolving 100 parts of the above obtained α-hydroxymethyl benzoin and 47 parts of methanesulfonyl chloride in 280 parts of tetrahydrofuran and 46 parts of triethyl amine were added dropwise to this solution taking 30 minutes. The mixture was heated for 2 hours under reflux. After cooling, the hydrochloride precipitated in the mixture was removed by filtration and the filtrate was concentrated by evaporating the solvent under reduced pressure to give 130 parts of a crystalline product. The yield of the product as crude was more than 99% of the theoretical value assuming that the product was 2-hydroxy-3-oxy-2,3-diphenylpropyl methanesulfonate.

The above obtained crude crystalline product was purified by dissolving in ethyl acetate and reprecipitating with addition of hexane to give 98 parts of a purified crystalline product which could be identified to be the desired 2-hydroxy-3-oxy-2,3-dipheylpropyl methanesulfonate from the results of the infrared spectrophotometric and NMR spectrometic analyses as well as from the melting point which was in good coincidence with the value reported in the above mentioned literature. This purified sulfonate compound is referred to as the photoinitiator I hereinbelow.

EXAMPLE 1

A mixture was prepared by uniformly blending 100 parts of an organopolysiloxane expressed by the formula

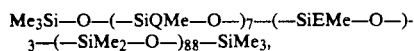

In which Me is a methyl group, Q is a 3-acryloxypropyl group and E is a 2-(3,4-epoxycyclohexyl)ethyl group, with 5 parts of the photoinitiator I prepared as described above. A polyethylene-paper laminated sheet was coated with this mixture in a coating thickness of about 1 μm.

The thus coated laminated sheet was irradiated for 0.4 second with ultraviolet light emitted from two high-pressure mercury lamps of 80 watts/cm output at a distance of 8 cm from the coating film to find that the coating film of the organopolysiloxane composition was fully cured. The laminated sheet provided with the surface-releasing layer in this manner was subjected to the evaluation tests to give the results that the peeling resistance was 43 g/5 cm width for the BPS-8170 adhesive and 50 g/5 cm width for the BPW-3110H adhesive within an acceptable range for a release paper sheet and the adhesiveness retention was as high as 97% to indicate that curing of the coating layer was complete without allowing migration of the silicone to the adhesive surface.

The above prepared composition was further admixed with 5 parts of sodium hexafluroantimonate per 100 parts of the organopolysiloxane and subjected to the same evaluation tests of the coated laminated sheet after curing by the ultraviolet irradiation for 0.2 second to give the results that the peeling resistance was 30 g/5 cm width for the Oribine BPS-8170 adhesive and 35 g/5 cm width for the Oribine BPW-3110H adhesive and the adhesiveness retention was 97%.

EXAMPLE 2

The experimental procedure was about the same as in Example 1 described above except that 100 parts of the acryloxy- and epoxy-containing organopolysiloxane used in Example 1 were replaced with a combination of 70 parts of a first organopolysiloxane expressed by the formula

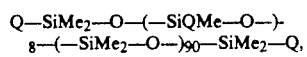

in which Q is a 3-acryloxypropyl group, and 30 parts of a second organopolysiloxane expressed by the formula

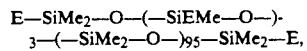

in which E is a 2-(3,4-epoxycyclohexyl)ethyl group, without admixture of sodium hexafluorantimonate and the irradiation time with ultraviolet light was 0.6 second instead of 0.4 second. The results of the evaluation tests of the thus cured surface-releasing coating film were that the peeling resistance was 24 g/5 cm width for the Oribine BPS-8170 adhesive and 20 g/5 cm width for the Oribine BPW-3110H adhesive and the adhesiveness retention was 97%.

The above prepared composition was further admixed with 5 parts of sodium hexafluorantimonate per 100 parts of the combination of the organopolysiloxanes and subjected to the same evaluation tests of the coated laminated sheet after curing by the ultraviolet irradiation for 0.4 second to give the results that the peeling resistance was 28 g/5 cm width for the Oribine BPS-8170 adhesive and 35 g/5 cm width for the Oribine BPW-3110H adhesive and the adhesiveness retention was 98%.

EXAMPLE 3

An ultraviolet-curable organopolysiloxane composition was prepared by uniformly blending 100 parts of the first organopolysiloxane used in Example 2 containing 3-acryloxypropyl groups, 5 parts of the same sulfonate compound as used in the preceding examples and 5 parts of sodium hexafluorantimonate. The composition was subjected to the same evaluation tests of the coated laminated sheet after curing by the ultraviolet irradiation for 0.2 second to give the results that the peeling resistance was 45 g/5 cm width for the Oribine BPS-8170 adhesive and 53 g/5 cm width for the Oribine BPW-3110H adhesive and the adhesiveness retention was 98%.

EXAMPLE 4

The experimental procedure as about the same as in Example 3 described above excepting replacement of the 3-acryloxypropyl-containing organopolysiloxane with the same amount of the second organopolysiloxane used in Example 2 containing 2-(3,4-epoxychclohexyl)ethyl groups and the evaluation tests of the coated laminated sheet were undertaken after curing by the ultraviolet irradiation for 0.2 second to give the results that the peeling resistance was 19 g/5 cm width for the Oribine BPS-8170 adhesive and 17 g/5 cm width for the Oribine BPW-3110H adhesive and the adhesiveness retention was 95%.

COMPARATIVE EXAMPLE

A composition prepared by blending 100 parts of the same acryloxy-and epoxy-functional organopolysiloxane as used in Example 1 with 5 parts of a commercial product of photopolymerization initiator (Darocure 1173, a product by Merck Co.), which was 2-hydroxy-2-methyl-1-phenyl propan-1-one of the structural formula $C_6H_5-CO-C(CH_3)_2-OH$ and sold as a radical photopolymerization initiator for acrylic oligomeric resins and the composition was subjected to ultraviolet curing in the same manner as in Example 1. The results of the evaluation tests were that curing of the coating film was incomplete even after the ultraviolet irradiation for 1.5 seconds showing smearing and rub-off.

We claim:

1. An ultraviolet-curable organopolysiloxane composition which comprises, as a mixture:
   (a) 100 parts by weight of an organopolysiloxane having a viscosity in the range of from 50 to 3000 centipoise at 25° C. and containing, in a molecule, at least one (meth)acryloxy-substituted monovalent hydrocarbon group or at least one epoxy- or glycidyloxy-substituted monovalent hydrocarbon group;
   (b) from 0.1 to 20 parts by weight of a sulfonate compound represented by the general formula $$R^1-CO-CR^2(OR^3)-CR_2{}^4-O-SO_2-R^5,$$

in which $R^1$ and $R^2$ are each an unsubstituted or substituted aryl group having 6 to 30 carbon atoms, $R^3$ is a hydrogen atom or a monovalent hydrocarbon group having 1 to 7 carbon atoms, $R^4$ is a hydrogen atom or a monovalent hydrocarbon group having 1 to 5 carbon atoms, $R^5$ is an unsubstituted or substituted monovalent hydrocarbon group having 1 to 20 carbon atoms; and
   (c) from 0.1 to 20 parts by weight of a salt represented by the general formula $$MA_q,$$

in which M is a cation of an alkali metal or alkaline earth metal element. A is a non-nucleophilic and non-basic anion selected from the group consisting of $SbF_6{}^-$, $SbCl_6{}^-$, $PF_6{}^-$, $BF_4{}^-$, $HSO_4{}^-$, and $ClO_4{}^-$ and the subscript q is 1 or 2.

2. The ultraviolet-curable organopolysiloxane composition as claimed in claim 1 in which the (meth)acryloxy-substituted monovalent hydrocarbon group is a 3-acryloxypropyl group.

3. The ultraviolet-curable organopolysiloxane composition as claimed in claim 1 in which the epoxy- or glycidyloxy-substituted monovalent hydrocarbon group is a 2-(3,4-epoxycyclohexyl)ethyl group.

4. The ultraviolet-curable organopolysiloxane composition as claimed in claim 1 in which the organopolysiloxane as the component (a) contains, in a molecule, at least one (meth)acryloxy-substituted monovalent hydrocarbon group and at least one epoxy- or glycidyloxy-substituted monovalent hydrocarbon group.

5. The ultraviolet-curable organopolysiloxane composition as claimed in claim 1 in which the component (a) is a combination of a first organopolysiloxane having at least one (meth)acryloxy-substituted monovalent hydrocarbon group in a molecule and a second organopolysiloxane having at least one epoxy- or glycidyloxy-substituted monovalent hydrocarbon group in a molecule.

6. The ultraviolet-curable organopolysiloxane composition as claimed in claim 1 in which the sulfonate compound as the component (b) is 2-hydroxy-3-oxy-2,3-diphenylpropyl methanesulfonate.

7. The ultraviolet-curable organopolysiloxane composition as claimed in claim 1 in which the salt as the component (c) is sodium hexafluorantimonate $NaSbF_6$ or sodium hexafluorophosphate $NaPF_6$.

8. A method for imparting surface-releasability to the surface of a substrate which comprises the steps of:
   (A) coating the surface of the substrate with an ultraviolet-curable organopolysiloxane composition comprising, as a mixture,
      (a) 100 parts by weight of an organopoly-siloxane having a viscosity in the range of from 50 to 3000 centipoise at 25° C. and containing, in a molecule, at least one (meth)acryloxy-substituted monovalent hydrocarbon group or at least one epoxy- or glycidyloxy-substituted monovalent hydrocarbon group;
      (b) from 0.1 to 20 parts by weight of a sulfonate compound represented by the general formula $$R^1-CO-CR^2(OR^3)-CR_2{}^4-O-SO_2-R^5,$$

in which $R^1$ and $R^2$ are each an unsubstituted or substituted aryl group having 6 to 30 carbon atoms, $R^3$ is a hydrogen atom or a monovalent hydrocarbon group having 1 to 7 carbon atoms, $R^4$ is a hydrogen atom or a monovalent hydrocarbon group having 1 to 5 carbon atoms, and $R^5$ is an unsubstituted or substituted monovalent hydrocarbon group having 1 to 20 carbon atoms; and
      (c) from 0.1 to 20 parts by weight of a salt represented by the general formula $$MA_q,$$

in which M is a cation of an alkali metal or alkaline earth metal element, A is a non-nucleophilic and non-basic anion selected from the group consisting of $SbF_6{}^-$, $SbCl_6{}^-$, $PF_6{}^-$, $BF_4{}^-$, $HSO_4{}^-$, and $ClO_4{}^-$ and the subscript q is 1 or 2 to form a coating layer; and
   (B) irradiating the coating layer with ultraviolet light in a dose sufficient to cure the organopolysiloxane composition.

9. The method for imparting the surface of a substrate with surface-releasability as claimed in claim 8 in which the coating layer has a thickness in the range from 0.1 to 100 μm.

10. An article of manufacture with improved surface releasability comprising:
   (A) a substrate having a surface and a coating layer on said surface, said coating layer comprising a UV-cured organopolysiloxane composition comprising, as a mixture,
      (a) 100 parts by weight of an organopolysiloxane having a viscosity in the range of from 50 to 3000 centipoise at 25° C. and containing, in a molecule, at least one (meth)acryloxy-substituted monovalent hydrocarbon group or at least one epoxy- or glycidyloxy-substituted monovalent hydrocarbon group;

(b) from 0.1 to 20 parts by weight of a sulfonate compound represented by the general formula $$R^1-CO-CR^2(OR^3)-CR_2{}^4-O-SO_2-R^5,$$

in which $R^1$ and $R^2$ are each an unsubstituted or substituted aryl group having 6 to 30 carbon atoms, $R^3$ is a hydrogen atom or a monovalent hydrocarbon group having 1 to 7 carbon atoms, $R^4$ is a hydrogen atoms or a monovalent hydrocarbon group having 1 to 5 carbon atoms, and $R^5$ is an unsubstituted or substituted monovalent hydrocarbon group having 1 to 20 carbon atoms; and (c) from 0.1 to 20 parts by weight of a salt represented by the general formula $$MA_q,$$

in which M is a cation of an alkali metal or alkaline earth metal element, A is a non-nucleophilic and non-basic anion selected from the group consisting of $SbF_6{}^-$, $SbCl_6{}^-$, $PF_6{}^-$, $BF_4{}^-$, $HSO_4{}^-$, and $ClO_4{}^-$ and the subscript q is 1 or 2.

11. An article of manufacture as in claim 10, wherein the coating layer has a thickness in the range of from 0.1 to 100 μm.

* * * * *